Figure 1:
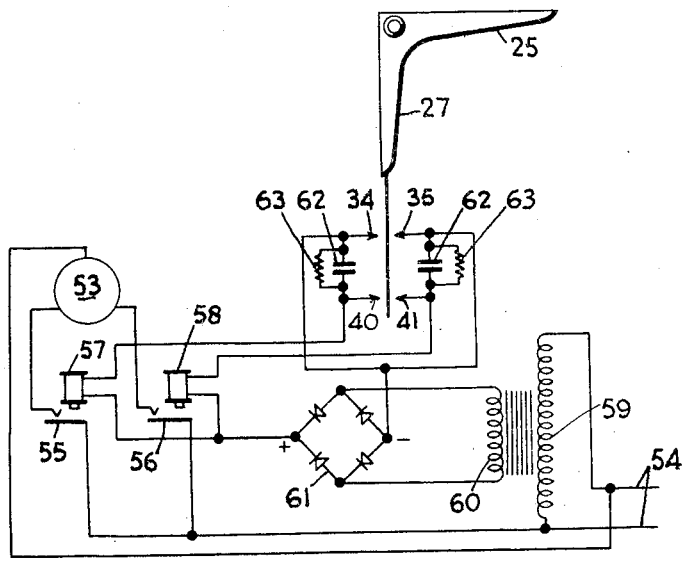

March 29, 1949.　　　　　H. LINDARS　　　　　2,465,891
ELECTRIC MOTOR CONTROL SYSTEM

Filed Aug. 10, 1945　　　　　　　　　　　　　3 Sheets-Sheet 1

Herman Lindars
by Pech & Pech

March 29, 1949. H. LINDARS 2,465,891
ELECTRIC MOTOR CONTROL SYSTEM
Filed Aug. 10, 1945 3 Sheets-Sheet 2

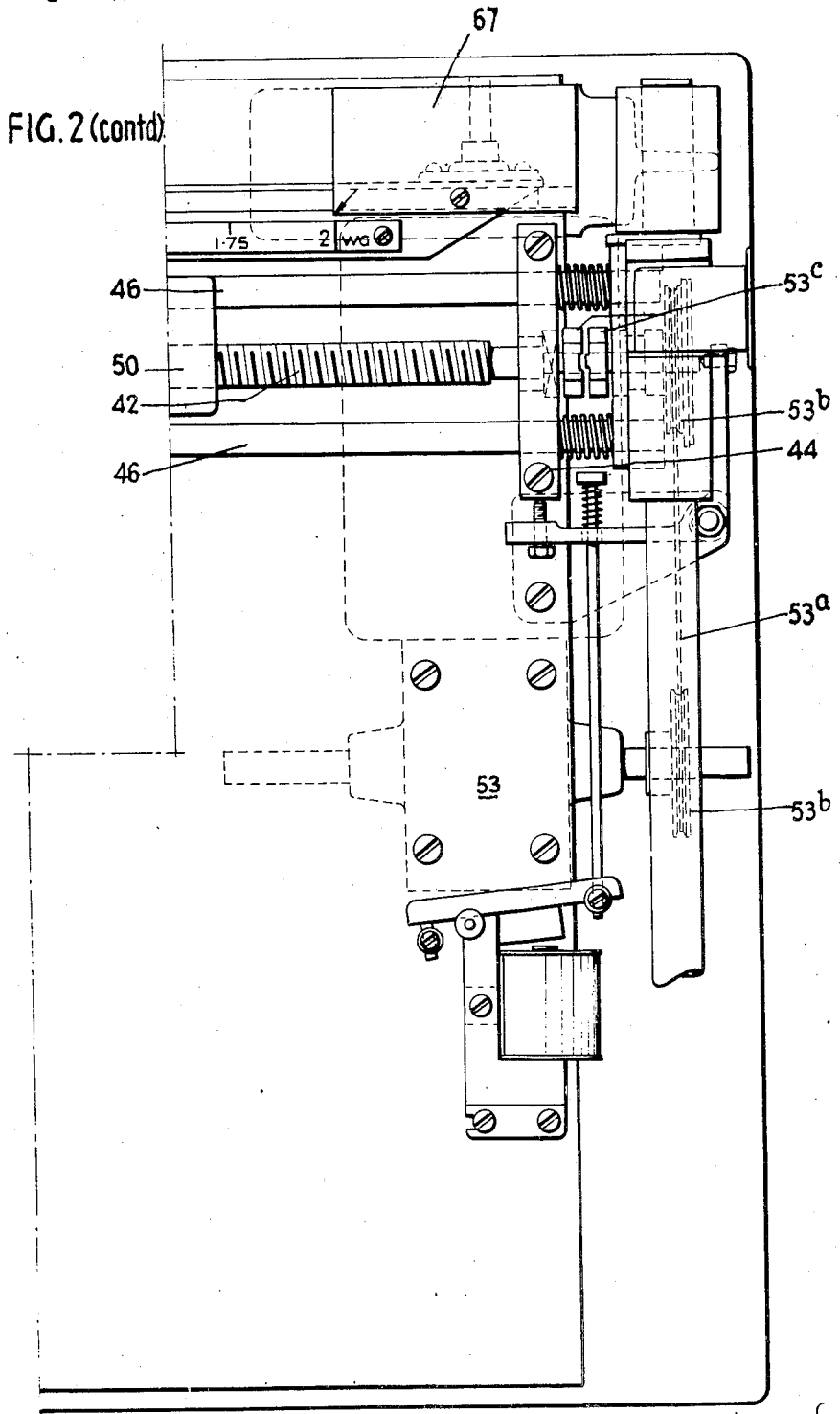

Patented Mar. 29, 1949

2,465,891

UNITED STATES PATENT OFFICE 2,465,891

ELECTRIC MOTOR CONTROL SYSTEM

Herman Lindars, Sheffield, England

Application August 10, 1945, Serial No. 610,126
In Great Britain August 9, 1943

14 Claims. (Cl. 318—32)

This invention relates to fluid pressure indicating, measuring, recording and operated, controlling or regulating apparatus particularly, but not exclusively, adapted to operate under low pressures or differential pressures.

The invention has among its objects to provide apparatus that is highly efficient in operation, which may be applied effectively to influence or control other apparatus, such as feed or supply apparatus for gaseous or fluid or solid substances, and which will be robust and highly sensitive.

The invention is fluid pressure indicating, measuring, recording and operated, controlling or regulating apparatus of the kind comprising a first pivoted arm or lever, means whereby the fluid pressure will exert a turning moment on said arm or lever about its pivot, means to exert an opposite turning moment on said arm or lever and electrical means to control said opposite turning moment operated by the movement of the arm or lever to bring it to a position of balance.

The invention comprises a first pivoted arm or lever, means whereby the fluid pressure will exert a turning moment on said arm or lever about its pivot, a second arm or lever which acts on the first arm or lever to exert an opposite turning moment thereon, electrical means to move the second arm or lever bodily to vary the point of action of the second arm or lever on the first arm or lever to bring the latter to a position of balance, said electrical means being controlled by the movement of a lever.

The means to provide the opposite turning moment may comprise a weight, which acts on the second arm or lever and said weight may be positioned to act at a fixed distance from the pivot of the first pivoted arm or lever. The length of the second arm or lever from its pivot to its point of contact with the first arm or lever is preferably equal to the distance of the line of action of the weight from the pivot to the first arm or lever.

A movable part of the means which controls the opposite turning moment may comprise or carry indicating means for the fluid pressure.

Further, when the apparatus is employed for controlling other apparatus a movable part of the means which controls the opposite turning moment, for example, the screw-threaded spindle may operate to control said other apparatus in accordance with the fluid pressure.

The fluid pressure may be applied to the first arm or lever through the medium of a bellows, diaphragm, fluid-sealed bell or the like which may be such as to exert a differential pressure or such differential pressure may be produced by a plurality of bellows, diaphragms or the like that may be of metal or other material such as leather or a fabric, and may be so disposed that the arm or lever moves in one direction or the other according to the point of application of the higher pressure. Again, differential pressures may be rendered effective to act upon the arm or lever through a bellows, diaphragm, fluid-sealed bell or the like that is subjected to the action in opposition of the related pressures and that is responsive to the differential pressure. In all applications the bellows or diaphragms or bells may be connected to the arm or lever by pivoted links, but in the measurement of differential pressure contact elements may suffice.

The invention further comprises the features hereinafter described.

One form of the invention will now be described, by way of example, and with reference to the accompanying diagrammatic drawings, wherein—

Figure 2:
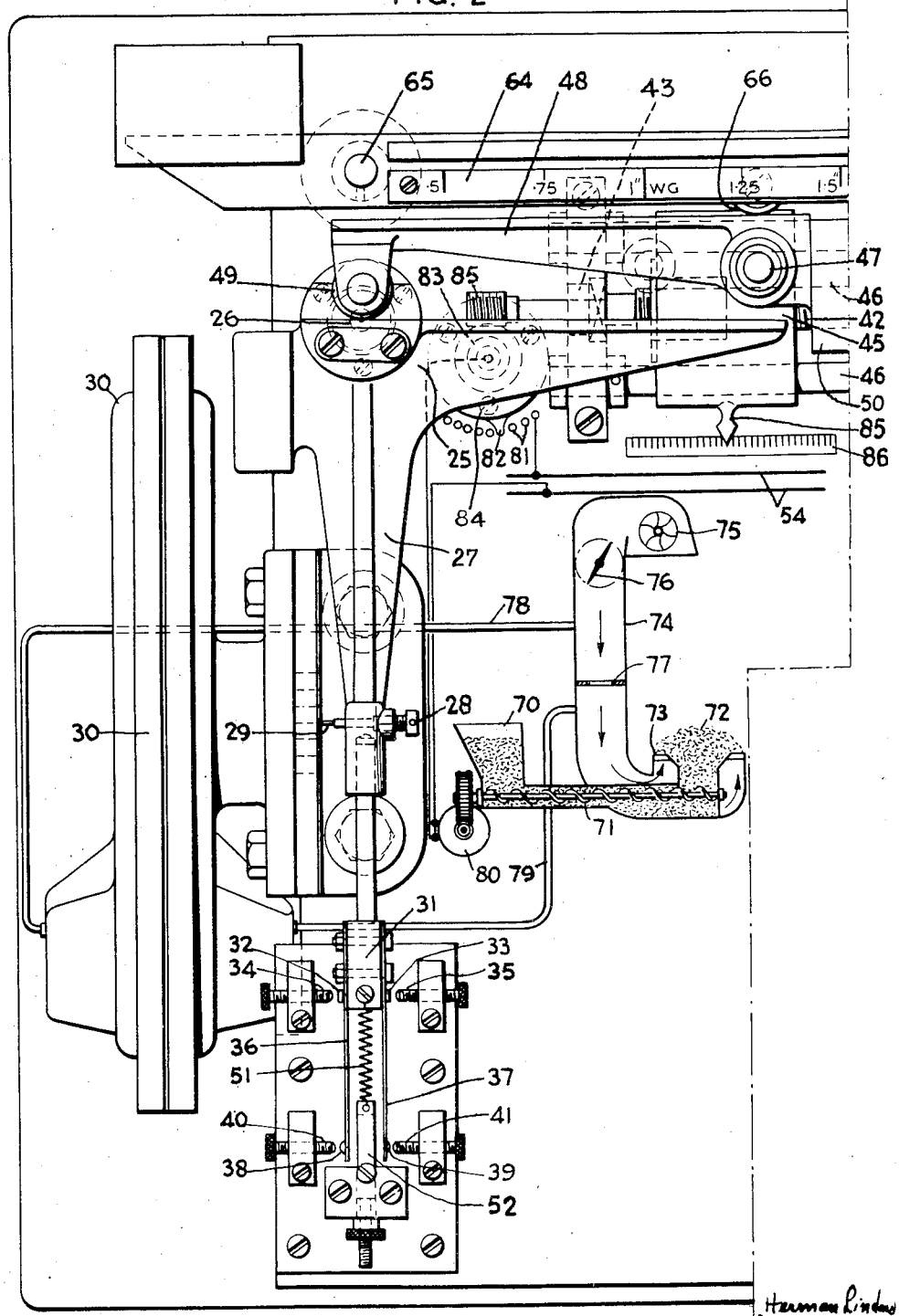

Figure 2 shows in elevation a construction of apparatus adapted for use as a fuel/air ratio controller in apparatus supplying fuel to a furnace and, Figure 1 is a diagram of part of the electrical connections of the apparatus illustrated in Fig. 2 and is to be read in conjunction therewith.

A first or bell-crank lever 25 is mounted to move about a pivot 26 forming its fulcrum and disposed so that the axis of the pivot lies in the plane of the upper surface of the arm of the lever that is normally horizontal. The depending arm 27 of the lever is connected at 28 to a stem 29 fitted to a diaphragm in a diaphragm chamber 30 so that it is subject to the movements of the diaphragm under the pressure of the air supply in respect of which the feed of fuel is to be measured about its pivot and which exerts a turning moment on said arm or lever. At a suitable position upon the lever arm 27 or an extension thereof, advantageously beyond the position of the application of the air pressure, the lever is provided with a contact element 31 bearing contacts 32, 33 adapted, in the movement of the lever in one direction or the other to engage respectively contacts 34, 35 connected to a source of current and also spring fingers 36, 37 bearing respectively contacts 38, 39 disposed between adjustable co-operating contacts 40, 41, insulated from each other, such that when the apparatus is subjected to normal air pressure and the arm 27 of lever 25 is in equilibrium, the contacts 32, 33 and 38, 39 float between the adjustable contacts 34, 35 and 40, 41 respectively. The contacts 40, 41 are respectively connected to relays in the respective motor control circuits determining the direction of rotation of the reversing motor 53 that is coupled through a belt and pulley reduction gear (generally illustrated at 53a and 53b) and a clutch 53c with a horizontally disposed screw-threaded spindle 42 mounted in fixed bearings 43, 44, such that it is supported in juxtaposition and parallel to the horizontal arm of the lever 25. A nut 45 that is screwed to co-operate with the screw-threaded spindle 42 and is supported on guide bars 46 so that it is prevented from rotating and is thus constrained to move axially on the spindle serves as a bearing for the pivot or fulcrum 47 of a second arm or lever 48 that has its free end supported upon the horizontal arm of the lever 25 by a roller 49. The second arm or lever 48 is advantageously provided with a counterweight 50 that may be longitudinally adjustable. The position of the weight is such that the lever is balanced. The proportions and dimensions of the arms or levers are such that in the zero position, i. e. with no fluid pressure or balanced fluid pressure on the diaphragm the nut 45 is positioned on the spindle 42 to dispose the roller 49 of the second arm or lever 48 over the fulcrum 26 of the first arm or lever 25.

The second arm or lever 48 supports a third arm or lever 64 the fulcrum 65 of which is fixed vertically above the fulcrum 26 of the first arm or lever 25 and that rests upon the second arm or lever 48 by means of a roller 66 disposed over the fulcrum of the arm or lever 48 when the said arm or lever is positioned with its roller 49 over the fulcrum 26 of the lever 25. The third arm or lever 64 conveniently carries a weight 67 that may be adjustable in position. Thus the length of the second arm or lever 48 from its pivot to its point of contact with the first arm or lever is equal to the distance of the line of action of the weight of the third arm or lever from the pivot of the first arm or lever.

The control and operating circuits for the reversing electric motor 53 are as illustrated in Figure 1 of the drawings which is to be taken as part of Fig. 2 and read in conjunction therewith. The motor 53 is connected across the mains 54 with forward and reverse switches 55, 56 that are operated by corresponding relays 57, 58. For the control circuit of the relays current is taken from the mains by way of a transformer 59, the secondary 60 of which is connected across a full wave metal rectifier 61 the positive terminal of which is connected to one of the terminals of each relay, while the negative terminal of the rectifier is connected as the supply to the contacts 34, 35 which are connected to the spaced contacts 40, 41 through corresponding condensers 62 shunted by resistances 63. The contacts 40, 41 are respectively connected to the remaining terminals of the relays 57, 58. When the lever arm 27 moves in one direction the contacts 34 and 40 are connected and when it moves in the other direction the contacts 35 and 41 are connected.

The current supply contacts 34, 35, which are advantageously closed after the contacts 40, 41, may serve also as stops to limit the movement of the contact element 31 and thus of the lever arm 27 of lever 25. To ensure against possible oscillation of the arm 27 of lever 25, by vibration a helical spring 51 is connected to the contact element 31 and tensioned by an adjustable member 52.

The furnace with which the apparatus is to be used is illustrated by way of example as a usual underfeed stoker construction in that it embodies a fuel feed hopper 70 with screw-conveyor feed 71 to the retort 72 and provision for the admission of air around the firebox as at 73 from an air supply conduit 74 at the entry end of which is a fan or blower 75 operating at constant speed.

A damper 76 in the conduit controls the flow of air therein. In addition an orifice plate 77 is inserted in the conduit between the fan and the firebox to constitute a constriction of the duct and pipe connections 78, 79 are led from the duct on either side of the plate to opposite sides of the diaphragm in the diaphragm chamber 30. 80 is an electric motor which drives the screw conveyor 71. The motor is connected to supply mains 54 through a rheostat 81 the movable arm 82 of which is mounted on the shaft 83 of the disc 84 which is driven by a worm drive 85 from the threaded spindle 42.

The operation of the apparatus is as follows: The motor 80 is continuously running. Should the volume of air passing through the conduit 74 vary, the pressure on the opposite sides of the orifice plate 77 will vary and consequently the diaphragm in the diaphragm chamber 30 will change position and exert a turning moment on the lever 25. Assume this is such as to move the lever 25 to close the contacts 34 and 40. The motor 53 will then start so as to move the second lever 48 through the nut 45 and the roller 49 to move to a position away from the pivot 26 of the lever 25. This movement continues until the opposite turning moment exerted by the weight 67 on the lever 64 acting through the roller 66, the second lever 48 and the roller 49 on the horizontal arm of the lever 25 restores the diaphragm in the chamber 30 to the neutral position when the contacts 34 and 40 open and the motor 53 stops. Should the differential pressure change in the opposite direction the contacts 35 and 41 will be closed and the motor 53 operate in the opposite direction to move the lever 48 in the opposite direction and so reduce the pressure on the diaphragm and permit it to return to its normal position thereby causing the contacts 35 and 41 to open and the motor 53 to stop. During the rotation of the threaded spindle 42 the disc 84 is changed in position so as to alter the speed of the motor 80 and thus the amount of fuel delivered by the screw conveyor 71 to the furnace.

The volume of air flowing from the conduit 74 is a function of the square root of the differential pressure on opposite sides of the orifice plate 77. The first lever 25 is acted upon directly by the diaphragm in the diaphragm chamber 30 and so is submitted to a pressure which is a function of the differential pressure in the conduit 74 and consequently is a function of the square of the air flow in the pipe line. This lever 25 is engaged by the roller 49 of the second lever which in turn is acted upon by the weighted third lever 64. The action of the third lever on the second lever 48 is on the same side of the fulcrum 47 of this second lever as is the point of contact 49 with the first lever. Since the disposition of the various levers is such that the distance of the fulcrum 26 of the first lever to the point of contact of the roller 49 of the second lever is, in all positions, the same as the distance between the fulcrum 47 of the second lever and the point of contact 66 with it of the weight of the third lever, the effect of the weight of the third lever on the first lever 25 depends upon the square of this distance. Consequently the restoring force exerted on the first lever 25 is a function of the square of the distance through which the second lever is moved to effect such restoration. Consequently the said distance is a function of the square root of the restoring force and thus of the differential pressure acting on the first lever 25 and is thus a direct function of the flow of air in the conduit 74. Thus the speed of the motor 80 is varied in accordance with the flow of air in the conduit 74.

The amount of movement of the second arm or lever from the zero position is a measure of the fluid pressure or the difference of pressure acting on the diaphragm in the chamber 30 and it may be indicated or recorded. Thus the nut 45 is shown as having a pointer 85 which moves over a scale 86. This scale may be calibrated in pressure. It will be understood that other indicating means may be provided. For example the shaft of the motor 53 may operate an indicator through gearing.

The first arm or lever may be subject to the influence of two bellows or diaphragms, each of which is subject to one of the pressures the difference of which is to be measured and which may be opposed to each other. There may, however, be provided a single bellows or other pressure transmitting device that is responsive to the differential pressure.

Though the apparatus has been described as one to effect the control of the feed of solid fuel to a furnace in proportion to the air flow, that is to say to the square root of differential pressure it will be understood that it may be employed to control other apparatus according to a fluid flow.

The apparatus according to the invention has the advantage that the movable element of the bellows or other pressure transmitting device is required to move through an exceedingly small distance from the zero position or position of balance irrespective of the pressure to be transmitted. Thus, errors which may be introduced by a considerable movement of the said element are avoided.

Since the magnitude of the weight applied, as the case may be, to the second or third arm or lever bears a relation to the pressure or flow to be measured, the capacity or range of use of the apparatus may readily be varied by adjustment or variation of one or the other or both of the said weights.

If the weight on the second arm or lever is adjustable it is possible for the slope of the square root curve representing the rate of flow of the fluid to be modified according to requirements. Thus, in the case where the apparatus is employed for the control of the rate of feed of fuel in accordance with the rate of flow of air through a furnace, when such rate is low, leakage in the firebox and elsewhere would require a departure from the theoretical fuel to air ratio. Adjustment of the position of the weight on the first of the auxiliary arms or levers permits of such modification of the square root curve that it is possible to determine the admission of less fuel at the low rates of air flow.

In certain instances it may be useful to weight or bias the first arm or lever in such manner that the value indicated, measured or recorded is the difference between the pressure exerted upon the first arm or lever and the weight exerted by the latter. For the purpose the first arm or lever may be provided to receive a weight or weights that may be adjustable of position thereon.

Similarly it may be desirable to bias the apparatus by ensuring that the weight exerted by a second or third lever is not applied over the fulcrum of the main arm or lever in the zero position.

The weight exerted by the third arm or lever in the apparatus of Fig. 2 may be substituted by a weight supported to act along a fixed line when the third arm or lever may be dispensed with.

What I claim is:

1. Fluid pressure indicating measuring, recording, operated controlling or regulating apparatus comprising a first pivoted arm or lever, means whereby the fluid pressure will exert a turning moment on said arm or lever about its pivot, a second arm or lever which acts on the first arm or lever to exert an opposite turning moment thereon, electrical means to move the second arm or lever bodily to vary the point of action of the second arm or lever on the first arm or lever to bring the latter to a position of balance, said electrical means being controlled by the movement of a lever.

2. Fluid pressure indicating measuring, recording, operated controlling or regulating apparatus comprising a first pivoted arm or lever, means whereby the fluid pressure will exert a turning moment on said arm or lever about its pivot, a second arm or lever which acts on the first arm or lever to exert an opposite turning moment thereon, a weight acting on the second arm or lever, electrical means to move the second arm or lever bodily to vary the point of action of the second arm or lever on the first arm or lever to bring the latter to a position of balance, said electrical means being controlled by the movement of a lever.

3. Fluid pressure indicating measuring, recording, operated controlling or regulating apparatus comprising a first pivoted arm or lever, means whereby the fluid pressure will exert a turning moment on said arm or lever about its pivot, a second arm or lever which acts on the first arm or lever to exert an opposite turning movement thereon, a weight acting at a fixed distance from the pivot of the first arm or lever on the second arm or lever, electrical means to move the second arm or lever bodily to vary the point of action of the second arm or lever on the first arm or lever to bring the latter to a position of balance, said electrical means being controlled by the movement of a lever.

4. Fluid pressure indicating, measuring, recording, operated controlling or regulating apparatus comprising a first pivoted arm or lever, means whereby the fluid pressure will exert a turning moment on said arm or lever about its pivot, a second arm or lever, preferably balanced, which acts on the first arm or lever to exert an opposite turning moment thereon, a third pivoted arm or lever, a weight carried on said third pivoted arm or lever and acting on the second arm or lever, electrical means to move the second arm or lever bodily to vary the point of contact of the weight with it and the point of action of it on the first arm or lever to bring the latter to a position of balance, said electrical means being controlled by the movement of a lever.

5. Apparatus according to claim 3, wherein the length of the second arm or lever from its pivot to its point of action on the first arm or lever is equal to the distance of the line of action of the weight from the pivot of the first arm or lever.

6. Apparatus according to claim 4, wherein the length of the second arm or lever from its pivot to its point of action on the first arm or lever is equal to the distance of the line of action of the weight from the pivot of the first arm or lever.

7. Fluid pressure indicating measuring, recording, operated controlling or regulating apparatus comprising a first pivoted arm or lever, means whereby the fluid pressure will exert a turning moment on said arm or lever about its pivot, a screw-threaded spindle, a nut co-operating therewith, a second arm or lever pivoted on the nut and which acts on the first arm or lever to exert an opposite turning moment thereon, and electric motor means to rotate the spindle and move the nut to bring the first arm or lever to a position of balance, said electric motor means being controlled by the movement of a lever.

8. Fluid pressure indicating, measuring, recording, operated controlling or regulating apparatus comprising a first pivoted arm or lever, means whereby the fluid pressure will exert a turning moment on said arm or lever about its pivot, a screw-threaded spindle, a nut co-operating therewith, a second arm or lever, preferably balanced, which acts on the first arm or lever to exert an opposite turning moment thereon, a third pivoted arm or lever, a weight carried on said third pivoted arm or lever and acting on the second arm or lever, and electric motor means to rotate the spindle and move the nut to bring the first arm or lever to a position of balance, said electric motor means being controlled by the movement of a lever.

9. Apparatus according to claim 8 wherein the length of the second arm or lever from its pivot to its point of action on the first arm or lever is equal to the distance from the pivot of the third arm or lever to the line of action of said third arm or lever on the second arm or lever.

10. Fluid pressure operated controlling apparatus comprising a first pivoted arm or lever, means whereby the fluid pressure will exert a turning moment on said arm or lever about its pivot, a second arm or lever which acts on the first arm or lever to exert an opposite turning moment thereon, electrical means to move the second arm or lever bodily to vary the point of action of the second arm or lever on the first arm or lever to bring the latter to a position of balance, said electrical means being controlled by the movement of a lever, and means operated by the means which moves the second arm or lever bodily to control other apparatus in accordance with the fluid pressure.

11. Fluid pressure operated controlling apparatus comprising a first pivoted arm or lever, means whereby the fluid pressure will exert a turning moment on said arm or lever about its pivot, a second arm or lever preferably balanced, which acts on the first arm or lever to exert an opposite turning moment thereon, a third pivoted arm or lever, a weight carried on said third pivoted arm or lever and acting on the second arm or lever, electrical means to move the second arm or lever bodily to vary the point of contact of the weight with it and the point of action of it on the first arm or lever to bring the latter to a position of balance, said electrical means being controlled by the movement of a lever, and means operated by the means which moves the second arm or lever bodily to control other apparatus in accordance with the fluid pressure.

12. Fluid pressure operated controlling apparatus comprising a first pivoted arm or lever, means whereby the fluid pressure will exert a turning moment on said arm or lever about its pivot, a screw-threaded spindle, a nut cooperating therewith, a second arm or lever pivoted on the nut and which acts on the first arm or lever to exert an opposite turning moment thereon, electric motor means to rotate the spindle and move the nut to bring the first arm or lever to a position of balance, said electric motor means being controlled by the movement of a lever, and means operated by the screw-threaded spindle to control other apparatus in accordance with the fluid pressure.

13. Apparatus according to claim 1 wherein the means whereby the fluid pressure will exert a turning moment on the first arm or lever comprises a bellows, diaphragm, fluid sealed bell or the like.

14. Apparatus according to claim 1 wherein the means whereby the fluid pressure will exert a turning moment on the first arm or lever comprises a bellows, diaphragm, fluid sealed bell or the like which will exert a differential pressure.

HERMAN LINDARS.

REFERENCES CITED

The following references are of record in the file of this patent:

UNITED STATES PATENTS

| Number | Name | Date |
|---|---|---|
| 1,076,656 | Mapelsden | Oct. 21, 1913 |
| 1,174,241 | Earl | Mar. 7, 1916 |
| 1,191,416 | Gibson | July 18, 1916 |
| 1,208,602 | Mapelsden | Dec. 12, 1916 |
| 1,682,602 | Dawley | Aug. 28, 1928 |